US008435010B2

(12) United States Patent
Dybing

(10) Patent No.: US 8,435,010 B2

(45) Date of Patent: May 7, 2013

(54) CONTROL OF A FLUID PUMP ASSEMBLY

(75) Inventor: Philip J. Dybing, Canton, MN (US)

(73) Assignee: Eaton Corporation, Cleveland, OH (US)

( * ) Notice: Subject to any disclaimer, the term of this patent is extended or adjusted under 35 U.S.C. 154(b) by 402 days.

(21) Appl. No.: 12/770,261

(22) Filed: Apr. 29, 2010

(65) Prior Publication Data

US 2011/0268587 A1 Nov. 3, 2011

(51) Int. Cl.

| | |
|---|---|
| ***F04B 1/26*** | (2006.01) |
| ***F01B 9/02*** | (2006.01) |
| ***F16D 31/02*** | (2006.01) |

(52) U.S. Cl.

USPC .................. 417/222.1; 92/13; 92/53; 60/452

(58) Field of Classification Search .................. 417/213, 417/222.1, 53; 92/13; 60/420, 452

See application file for complete search history.

(56) References Cited

U.S. PATENT DOCUMENTS

| | | | | |
|---|---|---|---|---|
| 3,928,968 A | | 12/1975 | Becker et al. | |
| 4,199,942 A | * | 4/1980 | Kasper | 60/420 |
| 4,801,247 A | * | 1/1989 | Hashimoto et al. | 417/213 |
| 5,129,230 A | | 7/1992 | Izumi et al. | |
| 5,511,458 A | | 4/1996 | Kamata et al. | |
| 5,876,185 A | | 3/1999 | Schimpf et al. | |
| 5,881,629 A | | 3/1999 | Gollner et al. | |
| 5,993,168 A | * | 11/1999 | Erkkilae et al. | 417/213 |
| 6,033,188 A | * | 3/2000 | Baldus et al. | 417/222.1 |
| 6,073,442 A | | 6/2000 | Creger et al. | |
| 6,216,456 B1 | | 4/2001 | Mitchell | |
| 7,637,039 B2 | | 12/2009 | Toda et al. | |

FOREIGN PATENT DOCUMENTS

| | | |
|---|---|---|
| CA | 1013236 | 7/1977 |

OTHER PUBLICATIONS

International Search Report and Written Opinion mailed Sep. 5, 2011.

Eaton® Medium Duty Piston Pumps, "Load Sensing Systems Principle of Operation", No. 03-206, Nov. 1992.

Eaton®, "420 Mobile Piston Pump Technical Manual", E-PUPI-TM002-E3, Sep. 2009.

* cited by examiner

*Primary Examiner* — Charles Freay

(74) *Attorney, Agent, or Firm* — Merchant & Gould P.C.

(57) ABSTRACT

A pump control assembly includes a fluid pump assembly having a fluid pump and a load sensing valve. The fluid pump includes a fluid inlet and a fluid outlet. The fluid pump includes a variable displacement mechanism. The load sensing valve is adapted to adjust the position of the variable displacement mechanism. The load sensing valve includes a first end and an oppositely disposed second end. An actuator is in fluid communication with the fluid pump assembly. A position sensor monitors the position of the actuator. A ramping valve provides selective fluid communication between the fluid outlet of the fluid pump and the first end of the load sensing valve. An electronic control unit is in electrical communication with the position sensor and the ramping valve. The electronic control unit transmits an output current to the ramping valve in response to the position of the actuator.

18 Claims, 5 Drawing Sheets

CONTROL OF A FLUID PUMP ASSEMBLY

BACKGROUND

Fluid systems used in various applications often have requirements that are variable. For example, fluid systems may require variable flow rates and variable fluid pressures. Load sensing pumps can be used to tailor the operation of a pump to meet the variable flow requirements of a given fluid system. A typical load sense pump uses flow and pressure feedbacks in the fluid system to adjust the flow requirements of the pump.

SUMMARY

An aspect of the present disclosure relates to a pump control assembly. The pump control assembly includes a fluid pump assembly having a fluid pump and a load sensing valve. The fluid pump includes a fluid inlet and a fluid outlet. The fluid pump includes a variable displacement mechanism. The load sensing valve is adapted to adjust the position of the variable displacement mechanism. The load sensing valve includes a first end and an oppositely disposed second end. An actuator is in fluid communication with the fluid pump assembly. A position sensor monitors the position of the actuator. A ramping valve provides selective fluid communication between the fluid outlet of the fluid pump and the first end of the load sensing valve to adjust the position of the variable displacement mechanism. An electronic control unit is in electrical communication with the position sensor and the ramping valve. The electronic control unit transmits an output current to the ramping valve in response to the position of the actuator.

Another aspect of the present disclosure relates to a pump control assembly. The pump control assembly includes a fluid pump assembly. The fluid pump assembly includes a fluid pump and a load sensing valve. The fluid pump includes a fluid inlet and a fluid outlet. The fluid pump includes a variable displacement mechanism that is movable between a neutral position and a first position. The load sensing valve is adapted to adjust the position of the variable displacement mechanism. The load sensing valve has a first end and an oppositely disposed second end. An actuator is in fluid communication with the fluid pump assembly. The actuator includes a housing having a first axial end and an oppositely disposed second axial end. The housing defines a bore. The actuator further includes a piston disposed in the bore of the housing. A ramping valve assembly includes a ramping valve that is disposed in fluid communication with the fluid outlet of the fluid pump. The ramping valve is electronically actuated to provide fluid communication between the fluid outlet of the fluid pump and the first end of the load sensing valve when the piston of the actuator approaches one of the first and second axial ends so that the variable displacement mechanism is moved toward the neutral position.

Another aspect of the present disclosure relates to a method for actuating a pump control assembly. The method includes providing a pump control assembly having a fluid pump, a load sensing valve, an actuator and a ramping valve. The fluid pump has a fluid inlet and a fluid outlet. The fluid pump includes a variable displacement mechanism. The load sensing valve is adapted to adjust the position of the variable displacement mechanism. The load sensing valve includes a first end and an oppositely disposed second end. The actuator is in fluid communication with the fluid outlet of the fluid pump. The ramping valve provides selective fluid communication between the fluid outlet and the first end of the load sensing valve. A signal from a position sensor is received. The position sensor is adapted to monitor the position of the actuator. An output current is transmitted to the ramping valve when the actuator approaches a travel limit of the actuator so that the variable displacement mechanism is displaced toward a neutral position.

A variety of additional aspects will be set forth in the description that follows. These aspects can relate to individual features and to combinations of features. It is to be understood that both the foregoing general description and the following detailed description are exemplary and explanatory only and are not restrictive of the broad concepts upon which the embodiments disclosed herein are based.

DRAWINGS

DETAILED DESCRIPTION

Reference will now be made in detail to the exemplary aspects of the present disclosure that are illustrated in the accompanying drawings. Wherever possible, the same reference numbers will be used throughout the drawings to refer to the same or like structure.

Figure 1:
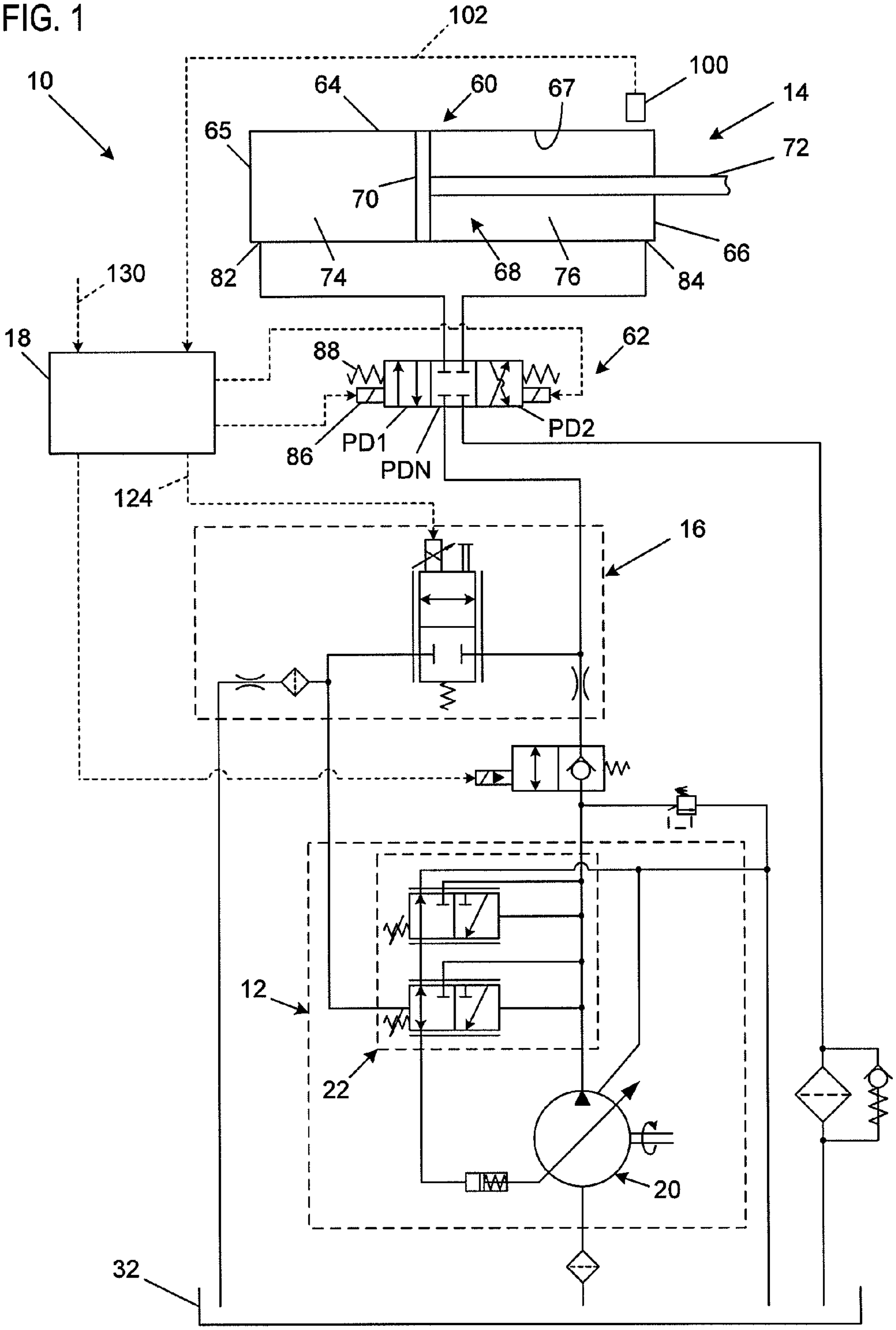
FIG. 1 is a schematic representation of a pump control assembly having exemplary features of aspects in accordance with the principles of the present disclosure.

Referring now to FIG. 1, a pump control assembly 10 is shown. The pump control assembly 10 is adapted to control the output of a fluid pump based on a position of an actuator. In the subject embodiment, the pump control assembly 10 is adapted to prevent spikes in fluid pressure when the actuator reaches its travel limit. In the depicted embodiment, of FIG. 1, the pump control assembly 10 includes a fluid pump assembly 12, an actuator assembly 14, a ramping valve assembly 16 and an electronic control unit 18.

Figure 2:
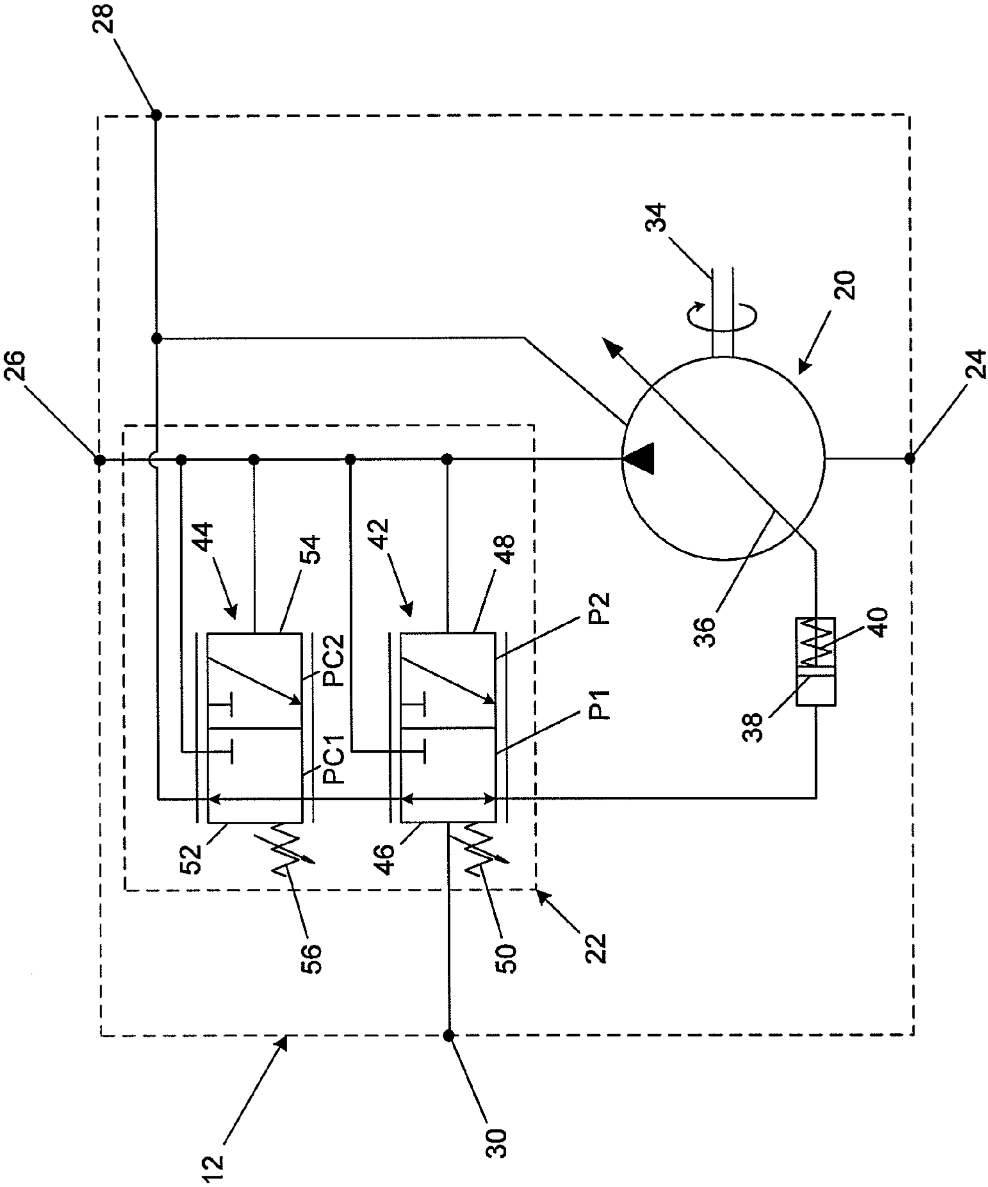
FIG. 2 is a schematic representation of a fluid pump assembly suitable for use in the pump control assembly of FIG. 1.

Referring now to FIGS. 1 and 2, the fluid pump assembly 12 will be described. The fluid pump assembly 12 includes a fluid pump 20 and a load sensing compensator valve assembly 22.

The fluid pump 20 includes a fluid inlet 24, a fluid outlet 26, a drain port 28 and a load sense port 30. The fluid inlet 24 of the fluid pump 20 is in fluid communication with a fluid reservoir 32. The fluid outlet 26 is in fluid communication with the actuator assembly 16. The drain port 28 is in fluid communication with the fluid reservoir 32.

The fluid pump 20 further includes a shaft 34. The shaft 34 is coupled to a power source (e.g., an engine, electric motor, etc.) that rotates the shaft 34. As the shaft 34 rotates, fluid is pumped from the fluid inlet 24 to the fluid outlet 26.

The fluid pump 20 is a variable displacement fluid pump. As a variable displacement pump, the fluid pump 20 includes a variable displacement mechanism 36. In the depicted embodiment, the fluid pump 20 is an axial piston pump and the variable displacement mechanism 36 is a swash plate. The swash plate 36 is movable between a neutral position and a full stroke position. In the neutral position, the displacement of the fluid pump 20 is about zero. At zero displacement, no fluid passes through fluid pump 20 as the shaft 34 rotates. In the full stroke position, a maximum amount of fluid passes through the fluid pump 20 as the shaft 34 rotates.

The fluid pump 20 includes a control piston 38 and a biasing member 40. The control piston 38 and the biasing member 40 act against the swash plate 36 to adjust the position of the swash plate 36. The control piston 38 is adapted to adjust the position of the swash plate 36 from the full stroke position to the neutral position. The control piston 38 is in selective fluid communication with the fluid outlet 26 of the fluid pump 20. The control piston 38 is in fluid communication with the load sensing compensator valve assembly 22.

The biasing member 40 is adapted to bias the fluid pump 20 toward the full stroke position. The biasing member 40 includes a spring that biases swash plate 36 toward the full stroke position.

The load sensing compensator valve assembly 22 is adapted to vary the flow of fluid and the pressure of the fluid from the fluid pump 20 as the flow and pressure requirements of the system employing the fluid pump 20 vary. In the depicted embodiment, the load sensing compensator valve assembly 22 includes a load sense valve 42 and a pressure limiting compensator 44. In one embodiment, the load sensing compensator valve assembly 22 is external to the fluid pump 20. In another embodiment, the load sensing compensator valve assembly 22 is integral to the fluid pump 20.

The load sensing valve 42 provides selective fluid communication between the control piston 38 and either the drain port 28 or the fluid outlet 26 of the fluid pump 20. In the depicted embodiment, the load sensing valve 42 is a proportional two-position, three-way valve. In a first position P1, the load sensing valve 42 provides fluid communication between the control piston 38 and the drain port 28 so that fluid acting against the control piston 38 is drained to the fluid reservoir 32 through the drain port 28. With the load sensing valve 42 in this first position P1, the swash plate 36 is biased toward the full stroke position by the biasing member 40.

In a second position P2, the load sensing valve 42 provides fluid communication between the control piston 38 and the fluid outlet 26 so that pressurized fluid acts against the control piston 38. With the load sensing valve 42 in this second position P2, the control piston 38 acts against the biasing member 40 to move the swash plate 36 toward the neutral position.

The load sensing valve 42 includes a first end 46 and an oppositely disposed second end 48. The first end 46 is in fluid communication with the load sense port 30. Fluid from the load sense port 30 acts against the first end 46 to actuate the load sensing valve 42 to the first position. In the depicted embodiment, a light spring 50 also acts against the first end 46 of the load sensing valve 42 to bias the load sensing valve 42 to the first position P1. In one embodiment, the combined load against the first end 46 of the load sensing valve 42 is equal to the pressure of the fluid from the load sensing port 30 plus about 200 psi to about 400 psi.

The second end 48 of the load sensing valve 42 is in fluid communication with the fluid outlet 26 of the fluid pump 20. When the fluid pressure acting on the second end 48 is greater than the fluid pressure acting on the first end 46, the control piston 38 actuates the swash plate 36 in a direction toward the neutral position, thereby decreasing the amount of fluid displaced by the fluid pump 20.

The pressure limiting compensator 44 is a type of pressure relieving valve. In the depicted embodiment, the pressure limiting compensator 44 is a proportional two-position, three-way valve. The pressure limiting compensator 44 includes a first end 52 and an oppositely disposed second end 54. A heavy spring 56 acts against the first end 52 of the pressure limiting compensator 44 while fluid from the fluid outlet 26 acts against the second end 54.

The pressure limiting compensator 44 includes a first position PC1 and a second position PC2. In the first position PC1, the pressure limiting compensator 44 provides a fluid passage to the drain port 28. When the pressure limiting compensator 44 is in the first position PC1 and the load sensing valve 42 is in the first position P1, fluid acting against the control piston 38 is drained to the fluid reservoir 32 through the drain port 28. With the pressure limiting compensator 44 in this first position PC1 and the load sensing valve 42 in the first position P1, the swash plate 36 is biased toward the full stroke position by the biasing member 40.

In the second position PC2, the pressure limiting compensator 44 provides fluid communication between the control piston 38 and the fluid outlet 26 so that pressurized fluid acts against the control piston 38. With the pressure limiting compensator 44 in this second position PC2, the control piston 38 acts against the biasing member 40 to move the swash plate 36 toward the neutral position.

As fluid pressure in the fluid outlet 26 rises and approaches a load setting of the heavy spring 56, the pressure limiting compensator 44 shifts toward the second position PC2 allowing fluid to pass to the control piston 38. As fluid acts against the control piston 38, the position of the swash plate 36 is moved toward the neutral position. This movement continues until the amount of fluid at the fluid outlet 26 of the fluid pump 20 is low enough to maintain the system pressure at the load setting of the heavy spring 56 or until the fluid pump 20 is in the neutral position. In one embodiment, the heavy spring 56 provides a load setting of about 2500 psi to about 3500 psi system pressure.

Referring now to FIG. 1, the actuator assembly 14 includes an actuator 60 and a directional control valve 62. The actuator 60 can be a linear actuator (e.g., a cylinder, etc.) or a rotary actuator (e.g., a motor, etc.). In the subject embodiment, the actuator 60 is a linear actuator.

The actuator 60 includes a housing 64. The housing 64 includes a first axial end 65 and an oppositely disposed second axial end 66.

The housing 64 defines a bore 67. A piston assembly 68 is disposed in the bore 67. The piston assembly 68 includes a piston 70 and a rod 72. The bore 67 includes a first chamber 74 and a second chamber 76. The first chamber 74 is disposed on a first side of the piston 70 while the second chamber 76 is disposed on an oppositely disposed second side of the piston 70.

The actuator 60 includes a first control port 82 and a second control port 84. The first control port 82 is in fluid communication with the first chamber 74 while the second control port 84 is in fluid communication with the second chamber 76.

The directional control valve 62 is in fluid communication with the actuator 60. In the depicted embodiment, the direction control valve 62 is a three-position, four-way valve. The direction control valve 62 includes a first position PD1, a second position PD2 and a closed center neutral position PDN.

In the first position, the direction control valve 62 provides fluid communication between the fluid pump 20 and the first control port 82 and between the second control port 84 and the fluid reservoir 32. In the depicted embodiment, the first position PD1 results in extension of the piston assembly 68 from the housing 64. In the second position PD2, the direction control valve 62 provides fluid communication between the fluid pump 20 and the second control port 84 and between the first control port 82 and the fluid reservoir. In the depicted embodiment, the second position PD2 results in retraction of the piston assembly 68.

In the depicted embodiment, the directional control valve 62 is actuated by a plurality of solenoid valves 86. A plurality of centering springs 88 is adapted to bias the directional control valve 62 to the neutral position PN1.

The pump control assembly 10 further includes a position sensor 100. The position sensor 100 is adapted to provide data to the electronic control unit 18 regarding the position of the actuator 60. The position sensor 100 can be an analog sensor or a digital sensor.

In one embodiment, the position sensor 100 is adapted to transmit a signal 102 to the electronic control unit 18 when the piston 70 approaches the first and/or second axial ends 65, 66 of the housing 64. As will be described in more detail subsequently, the electronic control unit 18 uses the data from the position sensor 100 to control the ramping valve assembly 16.

Figure 3:
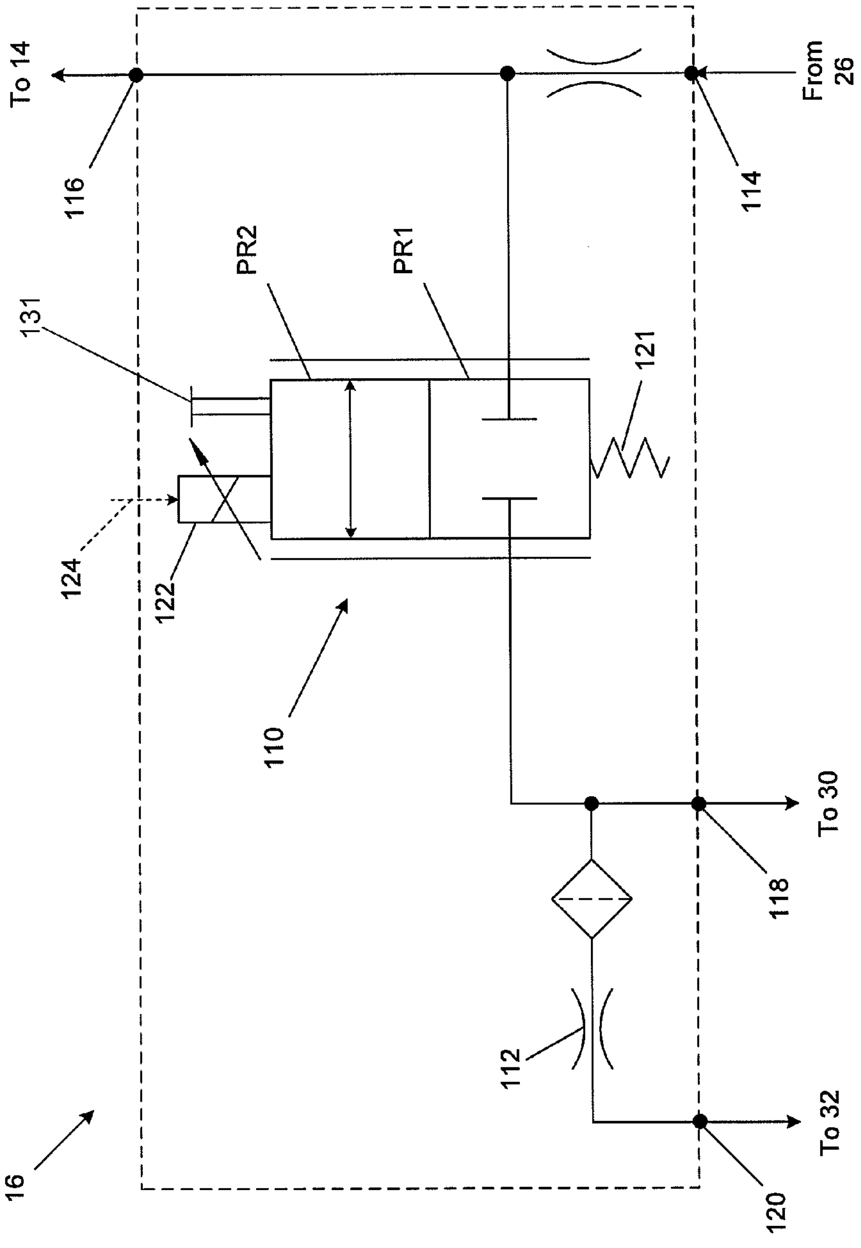
FIG. 3 is a schematic representation of a ramping valve assembly suitable for use in the pump control assembly of FIG. 1.
Figure 4:
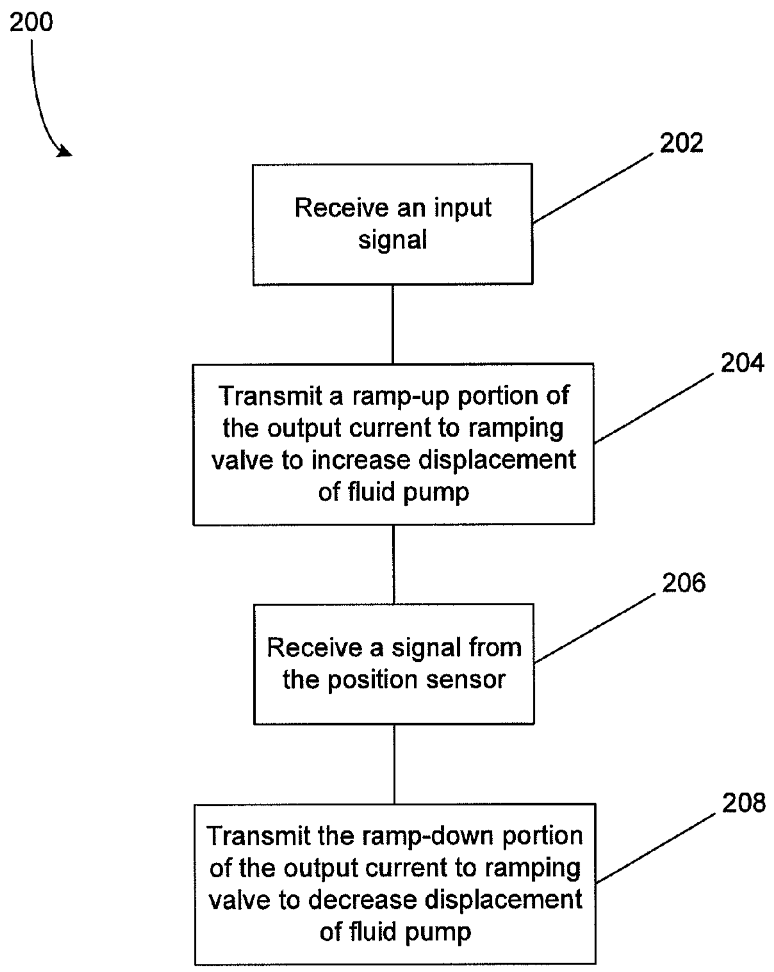
FIG. 4 is a representation of a method for operating the pump control assembly of FIG. 1.

Referring now to FIGS. 1 and 3, the ramping valve assembly 16 will be described. The ramping valve assembly 16 is adapted to control the fluid output of the fluid pump 20 based on the position of the actuator 60 of the actuator assembly 14. The ramping valve assembly 16 includes a ramping valve 110 and an orifice 112.

In the depicted embodiment, the ramping valve assembly 16 includes an inlet 114, an outlet 116, a load sense passage 118 and a drain passage 120. The inlet 114 is in fluid communication with the fluid outlet 26 of the fluid pump 20. The outlet 116 is in fluid communication with the directional control valve 62 of the actuator assembly 14. The load sense passage 118 is in fluid communication with the load sensing compensator valve assembly 22. The drain passage 120 is in fluid communication with the fluid reservoir 32.

The ramping valve 110 provides selective fluid communication between the fluid outlet 26 of the fluid pump 20 and the load sense port 30 of the fluid pump 20. In the depicted embodiment, the ramping valve 110 is a proportional two-position, two-way solenoid valve. In a first position PR1, the ramping valve 110 blocks fluid communication to the load sense port 30. In a second position PR2, the ramping valve 110 provides full fluid communication to the load sense port 30. A spring 121 biases the ramping valve 110 to the first position PR1.

The ramping valve 110 is actuated by a solenoid 122 in response to an output current 124 from the electronic control unit 18 (shown in FIG. 1). The output current 124 is sent from the electronic control unit 18 in response to the signal 102 from the position sensor 100. As the ramping valve 110 is a proportional valve, the flow of fluid through the ramping valve 110 is proportional to the output current 124 received by the solenoid 122 from the electronic control unit 18. Therefore, the flow of fluid to the load sense port 30 is proportional to the output current 124.

As the load sense port 30 is in fluid communication with the first end 46 of the load sensing valve 42 of the fluid pump assembly 12 and as the load sensing valve 42 is used to adjust the position of the swash plate 36, which controls the flow of fluid from the fluid pump 20, the flow of fluid from the fluid pump 20 is proportional to the output current 124. As will be described in greater detail subsequently, the output current 124 can be programmed to prevent spikes in fluid pressure when the piston 70 of the actuator assembly 14 reaches one of the first and second axial ends 65, 66 of the housing 64.

In the depicted embodiment, the ramping valve 110 also includes an actuation member 131 that is adapted for manual actuation. The actuation member 131 allows for a manual override of the solenoid 122.

The orifice 112 provides fluid communication between the load sense passage 118 and the drain passage 120. When the ramping valve 110 is in the first position PR1, fluid acting against the first end 46 of the load sensing valve 42 of the fluid pump assembly 12 is drained to the fluid reservoir 32 through the orifice 112. When the ramping valve 110 is actuated so that fluid passes from the inlet 114 to the load sense passage 118, the orifice 112 becomes saturated. With the orifice 112 saturated, fluid is directed from the ramping valve 110 to the first end 46 of the load sensing valve 42.

Referring now to FIGS. 1-4, a method 200 of operating the pump control assembly 10 will be described. In step 202, the electronic control unit 18 receives an input signal 130. In one embodiment, the input signal 130 is provided by an operator using an input device (e.g., joystick, steering wheel, etc.) that is adapted to control a function of a work vehicle (e.g., refuse truck, skid steer loader, backhoe, excavator, tractor, etc.).

In response to the input signal 130, the electronic control unit 18 sends the output current 124 to the solenoid 122 of the ramping valve 110 in step 204. The output current 124 is adapted to move the ramping valve 110 from the first position PR1 to the second position PR2 (i.e., to open the ramping valve 110).

Figure 5:
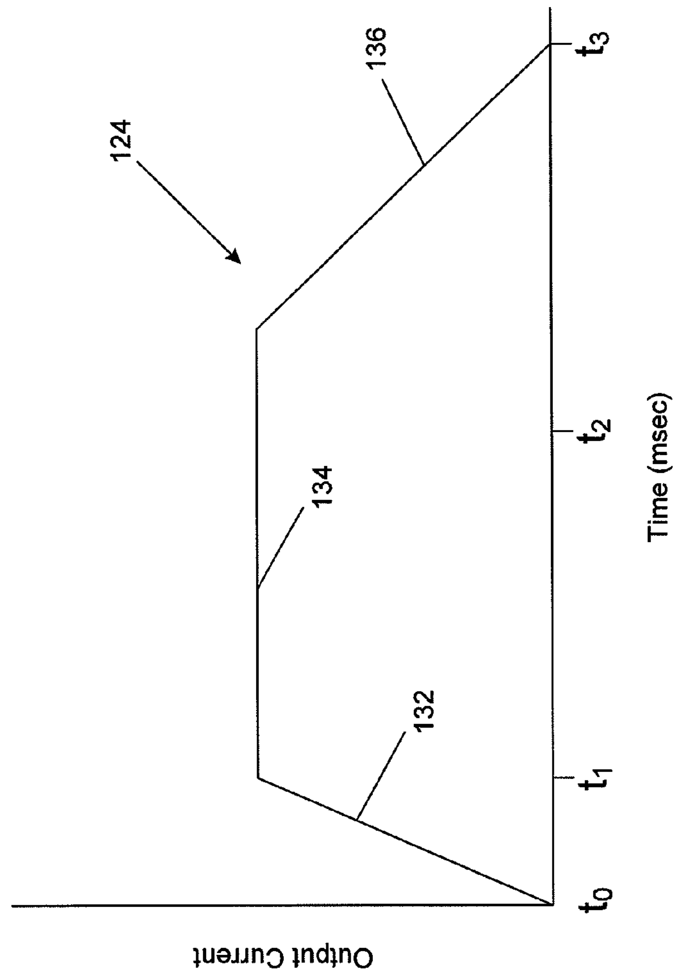
FIG. 5 is a graphical representation of an exemplary profile of an electronic signal transmitted from an electronic control unit to the ramping valve assembly of FIG. 3.

Referring now to FIG. 5, a graphical representation of an exemplary profile of the output current 124 is shown. The profile of the output current 124 includes a ramp-up portion 132, a sustain portion 134 and a ramp-down portion 136. In the ramp-up portion 132, the magnitude of the output current 124 increases over a predetermined time t so that the ramping valve 110 is gradually actuated to the second position PR2 (i.e., the ramping valve 110 opens). In the ramp-up portion 132, the output current 124 is at zero power at an initial time $t_0$ and increases to full power at time $t_1$. In one embodiment, the time between the initial time $t_0$ and time $t_1$ is less than about 500 ms. In another embodiment, the time between the initial time $t_0$ and time $t_1$ is in a range of about 200 ms to about 500 ms.

In the ramp-down portion 136, the magnitude of the output current 124 decreases over a predetermined time t so that the ramping valve 110 is gradually actuated to the first position PR1 (i.e., the ramping valve 110 closes). In the ramp-down portion 136, the output current 124 is at a given power at time $t_2$ and decreases to zero power at $t_3$. In one embodiment, the time between the time $t_2$ and the time $t_3$ is less than about 1000 ms. In another embodiment, the time between the time $t_2$ and the time $t_3$ is in a range of about 200 ms to about 1000 ms. In another embodiment, the time between the time $t_2$ and the time $t_3$ is equal to the time between the initial time $t_0$ and time $t_1$.

Referring now to FIG. 1-5, when the input signal 130 is received by the electronic control unit 18, the ramp-up portion 132 of the output current 124 is transmitted to the solenoid 122 in step 204. The actuation of the ramping valve 110 to the second position PR2 causes fluid from the fluid outlet 26 of the fluid pump 20 to be communicated to the first end 46 of the load sensing valve 42. The fluid at the first end 46 of the load sensing valve 42 gradually shifts the load sensing valve 42 to the first position P1, which gradually increases the displacement of the fluid pump 20.

In step 206, the electronic control unit 18 receives the signal 102 from the position sensor 100 that indicates that the piston 70 is adjacent to one of the first and second axial ends 65, 66 of the housing 64 of the actuator 14. In response to the signal 102, the ramp-down portion of the output current 124 is transmitted to the solenoid 122 of the ramping valve 110 in step 208.

The decreasing output current 124 in the ramp-down portion 136 causes that the ramping valve 110 to be gradually actuated from the second position PR2 to the first position PR1. As the ramping valve 110 is gradually actuated to the first position PR1, fluid acting on the first end 46 of the load sensing valve 42 is communicated to the fluid reservoir 32 through the orifice 112. As fluid acting on the first end 46 of the load sensing valve 42 is drained to the fluid reservoir 32, the displacement of the fluid pump 20 decreases. The decreasing displacement of the fluid pump 20 results in a decreased flow rate to the actuator assembly 14 through the fluid pump 20. In one embodiment, the swash plate 36 of the fluid pump 20 is adapted to be disposed in the neutral position as the piston 70 reaches one of the first and second axial end 65, 66 of the housing 64 of the actuator assembly 14.

The gradual decrease of the variable displacement mechanism 36 of the fluid pump 20 as the actuator 60 reaches its travel limit reduces or prevents pressure spikes in the fluid of the pump control assembly 10. This reduction in pressure spikes makes the operation of the pump control assembly 10 smoother.

Various modifications and alterations of this disclosure will become apparent to those skilled in the art without departing from the scope and spirit of this disclosure, and it should be understood that the scope of this disclosure is not to be unduly limited to the illustrative embodiments set forth herein.

What is claimed is:

1. A pump control assembly comprising:

a fluid pump assembly including:

a fluid pump having a fluid inlet and a fluid outlet, the fluid pump including a variable displacement mechanism;

a load sensing valve adapted to adjust the position of the variable displacement mechanism, the load sensing valve having a first end and an oppositely disposed second end;

an actuator in fluid communication with the fluid pump assembly;

a position sensor for monitoring the position of the actuator;

a ramping valve providing selective fluid communication between the fluid outlet of the fluid pump and the first end of the load sensing valve to adjust the variable displacement mechanism; and an electronic control unit in electrical communication with the position sensor and the ramping valve, wherein the electronic control unit is configured to transmit an output current signal including a ramp-down portion that decreases over a predetermined time interval, the output current signal being sent to the ramping valve in response to the position of the actuator to gradually adjust the variable displacement mechanism to a neutral position.

2. The pump control assembly of claim 1, wherein the ramping valve includes a proportional solenoid.

3. The pump control assembly of claim 1, wherein actuator is a linear actuator having a first axial end and an oppositely disposed second axial end.

4. The pump control assembly of claim 3, wherein the output current is transmitted to the ramping valve when a piston of the actuator is adjacent to one of the first and second axial ends.

5. The pump control assembly of claim 3, wherein a flow rate of the fluid pump decreases as a piston of the actuator approaches one of the first and second axial ends.

6. The pump control assembly of claim 1, wherein the time interval is in a range of about 200 ms to about 1000 ms.

7. A pump control assembly comprising:

a fluid pump assembly including:

a fluid pump having a fluid inlet and a fluid outlet, the fluid pump including a variable displacement mechanism;

a load sensing valve adapted to adjust the position of the variable displacement mechanism, the load sensing valve having a first end and an oppositely disposed second end;

an actuator in fluid communication with the fluid pump assembly;

a position sensor for monitoring the position of the actuator;

a ramping valve providing selective fluid communication between the fluid outlet of the fluid pump and the first end of the load sensing valve to adjust the variable displacement mechanism; and an electronic control unit in electrical communication with the position sensor and the ramping valve, wherein the electronic control unit transmits an output current to the ramping valve in response to the position of the actuator; and an orifice providing fluid communication between the first end of the load sensing valve and a fluid reservoir.

8. A pump control assembly comprising:

a fluid pump assembly including:

a fluid pump having a fluid inlet and a fluid outlet, the fluid pump including a variable displacement mechanism that is movable between a neutral position and a first position;

a load sensing valve adapted to adjust the position of variable displacement mechanism, the load sensing valve having a first end and an oppositely disposed second end;

an actuator in fluid communication with the fluid pump assembly, the actuator including:

a housing having a first axial end and an oppositely disposed second axial end, the housing defining a bore;

a piston disposed in the bore of the housing; and a ramping valve assembly including a ramping valve that is in fluid communication with the fluid outlet of the fluid pump;

an electronic control unit configured to electronically actuate the ramping valve to provide fluid communication between the fluid outlet of the fluid pump and the first end of the load sensing valve when the piston of the actuator approaches one of the first and second axial ends so that the variable displacement mechanism is moved toward the neutral position.

9. The pump control assembly of claim 8, wherein the ramping valve includes a proportional solenoid.

10. The pump control assembly of claim 9, further comprising a position sensor for monitoring the position of the piston in the bore of the housing.

11. The pump control assembly of claim 10, wherein the electronic control unit is in electrical communication with the position sensor and the proportional solenoid of the ramping valve.

12. The pump control assembly of claim 8, wherein the fluid pump is an axial piston pump and the variable displacement mechanism is a swash plate.

13. A pump control assembly comprising:

a fluid pump assembly including:

a fluid pump having a fluid inlet and a fluid outlet, the fluid pump including a variable displacement mechanism that is movable between a neutral position and a first position;

a load sensing valve adapted to adjust the position of variable displacement mechanism, the load sensing valve having a first end and an oppositely disposed second end;

an actuator in fluid communication with the fluid pump assembly, the actuator including:

a housing having a first axial end and an oppositely disposed second axial end, the housing defining a bore;

a piston disposed in the bore of the housing; and a ramping valve assembly including a ramping valve that is in fluid communication with the fluid outlet of the fluid pump, wherein the ramping valve is electronically actuated to provide fluid communication between the fluid outlet of the fluid pump and the first end of the load sensing valve when the piston of the actuator approaches one of the first and second axial ends so that the variable displacement mechanism is moved toward the neutral position, the ramping valve assembly including an orifice that provides fluid communication between the first end of the load sensing valve and a fluid reservoir.

14. A method for actuating a pump control assembly comprising:

providing a pump control assembly including:

a fluid pump having a fluid inlet and a fluid outlet, the fluid pump including a variable displacement mechanism;

a load sensing valve adapted to adjust the position of the variable displacement mechanism, the load sensing valve having a first end and an oppositely disposed second end;

an actuator in fluid communication with the fluid outlet of the fluid pump; and a ramping valve providing selective fluid communication between the fluid outlet and the first end of the load sensing valve;

receiving a signal from a position sensor, wherein the position sensor is adapted to monitor the position of the actuator;

transmitting an output current signal to the ramping valve when the actuator approaches a travel limit of the actuator so that the variable displacement mechanism is displaced toward a neutral position, wherein a profile of the output current signal includes a ramp-down portion that has a decreasing magnitude over a predetermined time interval.

15. The method of claim 14, wherein the position sensor is a digital sensor.

16. The method of claim 14, wherein the ramping valve includes a proportional solenoid actuator.

17. The method of claim 16, wherein the output current is transmitted to the proportional solenoid actuator of the ramping valve.

18. The method of claim 14, wherein magnitude of the output current decreases to zero in a time interval range of about 200 ms to about 1000 ms.

* * * * *